Aug. 4, 1970     S. BARA     3,523,242
METHOD AND APPARATUS FOR MEASURING "Q" OF A REACTIVE
ELEMENT IN A BRIDGE CIRCUIT
Filed Dec. 20, 1967

INVENTOR.
Stanley Bara
BY
ATTORNEYS

United States Patent Office 3,523,242
Patented Aug. 4, 1970

3,523,242
METHOD AND APPARATUS FOR MEASURING "Q" OF A REACTIVE ELEMENT IN A BRIDGE CIRCUIT
Stanley Bara, Morristown, N.J., assignor to Boonton Electronics Corporation, Parsippany, N.J., a corporation of New Jersey
Continuation-in-part of application Ser. No. 660,646, Aug. 15, 1967. This application Dec. 20, 1967, Ser. No. 698,368
Int. Cl. G01r 27/00
U.S. Cl. 324—57    17 Claims

ABSTRACT OF THE DISCLOSURE

The Q of a specimen reactance is measured by inserting the reactance in an A.C. reactance bridge as one arm thereof and bringing the bridge circuit to a null condition such that the output voltage of the bridge circuit is a minimum. A reference voltage is also read from the bridge circuit, and the ratio of the reference voltage to the first mentioned output voltage is measured to obtain the Q value of the reactance under test.

CROSS REFERENCES TO RELATED APPLICATIONS

This is a continuation-in-part of application Ser. No. 660,646, filed Aug. 15, 1967 (now abandoned) entitled Method and Apparatus for Measuring "Q."

BACKGROUND OF THE INVENTION

Field of the invention

This invention relates to a method and apparatus for measuring the Q of a reactor. The Q, or quality, of a reactive circuit element is a measure of the degree to which the impedance of such element approaches a perfect, or lossless, reactance. Because any reactor (capacitor or inductor) has associated with it certain losses, it can ordinarily be represented by a pure capacitor or inductor connected in series (or parallel) with a resistor, the resistor being a measure of the lossiness of the reactor.

When alternating current is applied to the reactor, some of the energy applied at the input is stored in the resulting electric or magnetic field, and a fraction of it is dissipated as heat, or so-called "$i^2r$" losses, where $r$ is the equivalent series resistance of the reactor mentioned above and $i$ is the current through the reactor. One definition of Q is the ratio of the maximum energy stored to the energy dissipated per cycle, times $2\pi$.

It can also be shown, for a resonant circuit, that the selectivity of such circuit is equal to Q, or the resonant frequency divided by the difference between its halfpower frequencies.

Still another way which Q may be defined for a series resonant circuit is as the ratio of the maximum RMS voltage (E) in the circuit, when it is driven by a sinusoid, to the RMS value ($e$) of the applied voltage. To be precise, the maximum RMS output voltage $E = e\sqrt{1+Q^2}$, which in the case of even moderately high Q reduces to $E = eQ$.

Description of the prior art

Several methods have in the past been developed for measuring Q. Hartshorn has proposed a method generally known as the bandwidth method which is described in "Radio Frequency Measurements by Bridge and Resonance Methods," L. Hartshorn, Wiley, 1940. This method does not, however, measure Q directly.

The Dynatron method proposed by Fruhauf (Precision Measurements of Capacitance, Inductance and Time Constants," E. Blechschmidt, Ed. vol. 13, Vieweg, 1956) is unsuitable for cored inductors, because it employs superimposed direct current.

The applicability of Klemt's method of differential substitution (see Blechschmidt, supra) is limited by the characteristics of certain circuit elements to the measurement of reactors with relatively low Q.

One commonly used method for Q measurement is known as the series resonance method, sometimes called the voltage magnification method. Its applicability is, however, limited under certain circumstances because of the necessity of using a small injection resistor; further, losses introduced by the measuring circuit must be known and compensated for to avoid measurement error.

SUMMARY OF THE INVENTION

According to the invention, the Q of a reactor is determined by connecting the reactor to be tested as one arm of a reactance bridge circuit. In contrast to previously known measurement methods involving the nulling of a bridge circuit, in which both the reactive and resistive components of the known impedance are minimized to obtain the null, according to the invention solely the reactive component is balanced out to achieve the null. The effect of the resistive component is therefore reflected in the bridge output voltage, permitting the accurate determination of Q. Although the invention is applicable to the measurement of inductive (or capacitive) reactances in an inductance bridge circuit, the present description will be directed to the use of apparatus including a capacitance bridge circuit to measure directly the Q of either a capacitive or an inductive test specimen. After the specimen capacitor is connected as an arm of the capacitance bridge circuit, a variable reference capacitor forming one arm of such bridge circuit is adjusted to minimize, or null, the bridge output voltage, which output voltage is a function of Q for the element under test. In particular, the ratio of a known or easily measurable reference voltage ($e_r$) to such output voltage ($e_o$) at bridge null is equal to Q.

Advantageously, the variable reference capacitor has a high Q and is linked to an indicator for displaying its instantaneous capacitance value.

Switching means may conveniently be provided for connecting the bridge circuit such that the detector indicates the required reference voltage. $e_r$.

Additional capacitors having known values of capacitance may be connected in the bridge circuit to enable the measurement of Q under an extremely wide range of capacitance values of the reactor to be measured. The invention thus provides apparatus for and a method of measuring Q without the necessity of having a resonating inductor, as is required for measuring Q by conventional means.

BRIEF DESCRIPTION OF THE DRAWINGS

Particular embodiments of the invention will be described with reference to the acompanying drawings, in which.

DESCRIPTION OF THE PREFERRED EMBODIMENTS

Figure 1:
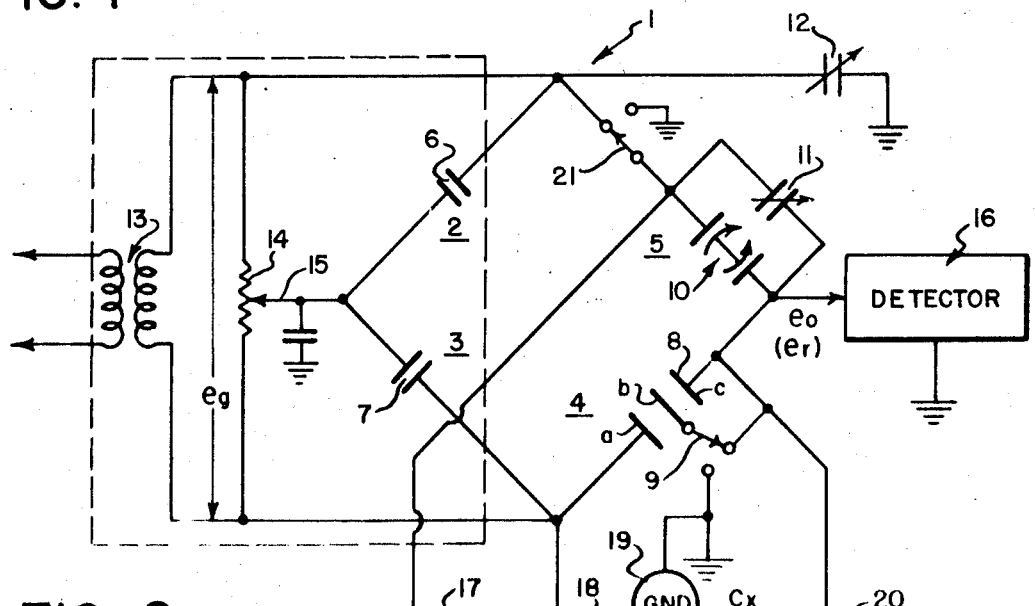
FIG. 1 is a schematic circuit diagram showing a capacitance bridge according to the invention.

As shown in FIG. 1, apparatus in accordance with the invention includes a bridge circuit 1 having four arms 2, 3, 4 and 5. Arms 2 and 3 comprise one series branch of the bridge circuit and arms 4 and 5 comprise the other series branch of the bridge circuit. The arms 2 and 3 contain capacitors 6 and 7, respectively, of known values of capacitance which are in the ratio $1:n$. Arm 4 of the bridge circuit is shown containing a test capacitor 8 of known capacitance value, which may be conveniently effectively switched in and out of the bridge circuit by means of a single-pole double-throw switch 9. The test capacitor 8 will be further described later.

Arm 5 of the bridge circuit contains a reference capacitor 10 which has a high Q and is adjustable over a range of capacitance values generally chosen in accordance with the ratio $1:n$ and the desired measurement range of the apparatus. The reference capacitor 10 includes an indicator (not shown) for reading out its precise value of capacitance. The reference capacitor may advantageously be of the type, the capacitance of which is a function of the orientation of its internal structure, which orientation is indicated on a highly accurate scale calibrated in terms of capacitance.

The reference capacitor 10 is shunted by a variable balance capacitor 11, and capacitor 6 is shunted by a variable trimmer capacitor 12.

An A.C. voltage is impressed across one diagonal of the bridge, as shown in FIG. 1, and is derived from a signal source which is connected to the bridge through a transformer 13. Also connected across the same bridge diagonal in parallel with the transformer 13 is a balance potentiometer 14 having a high resistance (e.g. 1MΩ), the adjustable center tap 15 of which is connected to ground. As used herein, ground potential is that which appears between capacitors 6 and 7. Balance potentiometer 14 permits equalization of the Q's of capacitors 6 and 7, thereby balancing the resistive elements of the bridge, just as capacitor 10 balances the reactive elements.

A detector 16 for detecting and indicating the bridge output voltage is connected across the remaining bridge diagonal. Terminals are provided on the housing (not shown) of the apparatus for connecting various circuit elements, to be described, in the bridge circuit. These terminals are connected to various points in the bridge circuit and include an "R" terminal 17, "Lo" terminal 18, "Ground" terminal 19 and "Hi" terminal 20.

Figure 4:
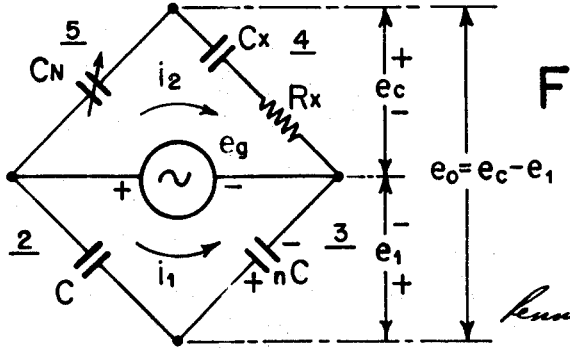
FIG. 4 is a schematic circuit diagram of a simplified bridge circuit for analyzing the transfer function of the bridge circuit.

The method of the invention can best be understood by first considering the transfer function $e_o/e_g$ for the bridge circuit of FIG. 1 which transfer function will be derived with respect to the simplified bridge circuit shown in FIG. 4.

In the circuit of FIG. 4, the element to be tested is represented by a capacitor $C_x$ in series with a resistor $R_x$, and a variable reference capacitor $C_n$ is connected in the leg adjacent that containing $C_x$ so that the two together comprise one series branch of the bridge circuit. The other series branch of the bridge circuit comprises two arms, each containing a capacitor, the values of which are C and $nC$ respectively. Referring to the loop current and voltage designations shown in FIG. 5, $e_o$ may be derived from the following equations:

$$Z_x = R_x - j1/\omega C_x = 1/Y_x \qquad (1)$$

$$Y_x = j\omega C_x + G_x \qquad (2)$$

(where $G_x$ is an equivalent parallel conductance)

$$Q_x = \frac{\omega C_x}{G_x} \qquad (3)$$

$$Y_x = \frac{\omega C_x (1+jQ_x)}{Q_x} \qquad (4)$$

$$Z_x = \frac{1}{Y_x} = \frac{Q_x}{\omega C_x (1+jQ_x)} \qquad (5)$$

$$i_1 = \frac{e_g}{\frac{1}{j\omega C} + \frac{1}{j\omega nC}} = e_g \left(\frac{n}{n+1}\right) j\omega C \qquad (6)$$

$$e_1 = \frac{i_1}{j\omega nC} = \frac{e_g}{n+1} \qquad (7)$$

$$i_2 = \frac{e_g}{Z_x + Z_n} \qquad (8)$$

$$Z_n = \frac{1}{j\omega C_n} \qquad (9)$$

$$Z_x + Z_n = \frac{Q_x(C_n + C_x) - jC_x}{\omega C_x C_n (1+jQ_x)} \qquad (10)$$

$$i_2 = e_g \left\{ \frac{\omega C_x C_n (1+jQ_x)}{Q_x(C_n + C_x) - jC_x} \right\} = \frac{e_g}{Z_x + Z_n} \qquad (11)$$

$$e_x = i_2 Z_x = e_g \left\{ \frac{Q_x C_n}{Q_x(C_n + C_x) - jC_x} \right\} \qquad (12)$$

$$e_x = e_g \left\{ \frac{Q_x^2 C_n (C_n + C_x) + jQ_x C_n C_x}{C_x^2 + Q_x^2 (C_n + C_x)^2} \right\} \qquad (13)$$

$$e_o = e_x - e_1 \qquad (14)$$

$$e_o = e_g \left\{ \frac{nC_n^2 Q x^2 + C_n C_x Q_x^2 (n-1) - C_x^2(1+Q_x^2) + j(n+1) Q_x C_n C_x}{(n+1)\{C_x^2 + Q_x^2 (C_n + C_x)^2\}} \right\} \qquad (15)$$

The preceding equation is a general one for $e_o$ regardless of the bridge tuning. From this equation an expression may be obtained for $e_o$ at null (minimum voltage output) as a function of $n$, $C_x$, $C_n$ and $Q_x$.

First consider the high Q condition, as $Q_x$ tends to infinity:
Then, $$e_o \bigg|_{Q_x \to \infty} = e_g \left\{ \frac{nC_n^2 + C_n C_x (n-1) - C_x^2 + j\frac{(n+1)C_x C_n}{Q_x}}{(n+1)(C_n + C_x)^2} \right\} \qquad (16)$$

$$e_o \bigg|_{Q_x \to \infty} = e_g \left\{ \frac{(nC_n - C_x)(C_n + C_x) + j\frac{(n+1)C_x C_n}{Q_x}}{(n+1)(C_n + C_x)^2} \right\} \qquad (17)$$

Minimum voltage occurs when the real part of the above expression goes to zero, or $$nC_n = C_x \text{ or } C_n = C_x/n \qquad (18)$$

Making the above substitution, $e_o$ at null is $$e_o \bigg|_{Q_x \to \infty} (\text{null}) = e_g \left\{ \frac{j\frac{(n+1)}{n}\frac{C_x^2}{Q_x}}{(n+1)\left(\frac{C_x^2(n+1)^2}{n^2}\right)} \right\}$$

$$= e_g \left( j\frac{n}{(n+1)^2} \frac{1}{Q_x} \right) \qquad (19)$$

By comparing the value of $e_o$ (null) to a reference voltage, the Q of the test specimen may be obtained. Letting $$Q_x = \frac{e_{\text{ref}}}{e_o (\text{null})}$$

the reference voltage is $$e_{\text{ref}} = Q_x e_o (\text{null}) = e_g \left( j\frac{n}{(n+1)^2} \right) \qquad (20)$$

Since the detector is not phase sensitive, the $j$ operator may be disregarded, so that $$e_{ref}\Big|_{Q_x \to \infty} = e_g \left\{\frac{n}{(n+1)^2}\right\} \quad (21)$$

The above analysis is based on high $Q_x$ conditions, and is accurate to less than 1% error for $Q>10$.

In order to investigate the result for low Q conditions, consider the general expression for $e_0$.

Since for any bridge configuration $n$ is fixed, the independent variable is $C_n$. Differentiating the expression for $e_0$ (Equation 15) with respect to $C_n$, and setting the derivative equal to zero leads to an expression for the value of $C_n$ at null. This in turn enables the error in capacitance and "Q" readout to be evaluated. Since the detector measures the absolute value of the bridge output voltage, the value of $C_n$ at the minimum of $|e_0|$ must be determined. This can be found by first squaring $e_0$ and then differentiating with respect to $C_n$. That is:

$$\frac{d|e_0|}{dC_n} = o \text{ at null} \quad (22)$$

$$\frac{d(e_0)^2}{dC_n} = o \text{ at null} \quad (23)$$

Squaring and differentiating we obtain $$C_n^4 C_x n Q_x^4 + C_n^3 C_x^2 [Q_x^4(3n-1) + Q_x^2(n-1)] \quad (24)$$
$$+ C_n^2 C_x^3 [Q_x^4(3n-3) + Q_x^2(3n-3)]$$
$$+ C_n C_x^4 [Q_x^4(n-3) + Q_x^2(2n-4) + n-1]$$
$$+ C_x^5 [-(Q_x^2+1)^2] = 0$$

A compact exact analytical expression for $C_n$ as a function of $C_x$, $n$, and $Q_x$ does not exist. Numerical analysis of the above expression shows that for $Q_x > 1$, $$C_n \simeq \frac{C_x}{n - \frac{1}{Q_x^2 + 1}} \quad (25)$$

As $Q_x \to \infty$, this becomes $C_n = C_x/n$, which agrees with the high $Q_x$ analysis. Assuming that $n=20$ for a given bridge configuration, we can solve for $e_0$ at various low $Q_x$ values. Dividing these values into the value for $e_{ref}$, the error in the measured $Q(Q_m)$ can be evaluated:

| $Q_x$ | $Q_m$ | Percent Error |
|---|---|---|
| 1 | 1.38 | 38 |
| 2 | 2.21 | 10 |
| 3 | 3.15 | 5 |

This expression converges rapidly to the correct value as $Q_x$ increases.

The above demonstrates that the Q of a capacitor may be measured in the bridge circuit of FIG. 1 by adjusting the value of the reference capacitor 10 so that the detector voltage $e_0$ is a minimum. If the bridge circuit were driven from a perfect voltage source (i.e., zero impedance) then the applied voltage $e_g$ would be constant and, since $n$ is known, $e_r$ would be known and the detector output meter could be calibrated directly in terms of the unknown Q. However, since the applied voltage $e_g$ is not provided by an ideal source and does, therefore, vary to some extent with operating conditions, it is advantageous to measure the reference voltage $e_r$ each time a Q measurement is made.

For this purpose, a switch 21 is provided for reconnecting the bridge circuit 1 (actually, the circuit is no longer a bridge circuit, when so reconnected) such that a voltage $e_r$ appears at the input terminals of the detector 16. It has been shown (Equation 21) that the reference voltage $$e_{ref}\Big|_{Q_x \to \infty} = e_g \frac{n}{(n+1)^2}$$

Thus by actuating switch 21, to connect to ground the terminal of reference capacitor 10 common to one terminal of the voltage source, an impedance is placed in circuit between the voltage source $e_g$ and the detector terminals which, it can be shown, is characterized by a transfer function equal to $$\frac{n}{(1+n)^2}$$

It will be apparent that, in some instances, capacitance will have to be switched into the bridge circuit, when switch 21 is actuated, to compensate for changes in the effect of stray capacity to ground of the housing and wiring due to actuation of switch 21. Further, for very low values of $n$ (less than about 10) it is necessary to connect the aforementioned terminal of reference capacitor 10 to ground through a compensating impedance (not shown). The compensating impedance must have a value of impedance such that the transfer function $e_r/e_g$ is in fact equal to $$\frac{n}{(1+n)^2}$$

The measurement range of the apparatus of FIG. 1 is determined by the ratio $1:n$ and the capacitance range of reference capacitor 10. Advantageously, a value of $n=20$ may be provided (e.g., capacitor 6 is 250 pf. and capacitor 7 is 5000 pf.); if the reference capacitor 10 is adjustable from 1 to 50 pf., the bridge circuit may then be nulled for capacitors to be measured of from about 20 pf. to 1000 pf.

While capacitors 6 and 7 have Q's much greater than 10, so that the effect of their equivalent series resistances is small, this effect is effectively compensated by the resistance balancing arrangement comprised of resistor 14 and the associated center tap 15 to ground, as will be described.

To measure the Q of a capacitor, it is connected in circuit between the Hi and Lo bridge terminals 20 and 18, placing it in arm 4 of the bridge. Before so connecting the specimen capacitor, however, the test capacitor 8 is connected in arm 4 of the bridge circuit in place of the capacitor to be measured, or specimen capacitor, by actuating switch 9, which may be controlled from the front panel of the apparatus housing. The bridge is brought to a null by adjusting the value of test capacitor 8, after which the center tap 15 is adjusted for minimum detector voltage $e_0$. This minimizes the differential Q of capacitors 6 and 7 which permits highly accurate measurement of the specimen Q, particularly for high Q specimens.

To facilitate minimization of the differential Q of capacitors 6 and 7, the test capacitor 8 is designed to have a high Q, preferably over 30,000. It is constructed of three parallel plates 8a, 8b and 8c, serially arranged, the end plates 8a and 8c being connected in circuit as the bridge element in arm 4, and the center plate 8b being connectible alternatively to the plate 8c and ground. When the center plate 8b is connected to the plate 8c by actuating switch 9, the test capacitor is placed in circuit in the bridge. When switch 9 is de-actuated to connect the center plate 8b to ground, the test capacitor is seen by the bridge effectively as an open circuit, leaving the specimen capacitor as arm 4 of the bridge. Due to the particular construction of test capacitor 8, grounding the center plate 8b creates an electrical "guard" such that the inter-terminal capacitance between the Lo and Hi terminals is minimized.

When the center tap 15 is adjusted for a null, the variable compensating capacitors 11 and 12 may conveniently be adjusted. Capacitor 11 is a balance adjustment for compensating for the lower end of the range of the reference capacitor 10; it is varied to optimize the null obtained as described above. Trimmer capacitor 12 compensates for stray capacitance and, being in parallel with capacitor 6, permits fine adjustment of the value of the ratio $n$.

After the adjustable tap 15 has been adjusted to produce a detector null with the test capacitor 8 in the bridge arm 4, the center plate 8b of test capacitor 8 is connected to ground via switch 9 and the specimen capacitor to be measured is connected between the Hi and Lo terminals 20 and 18. The bridge circuit is then brought to a null condition by varying the capacitance of reference capacitor 10 until the detector voltage is a minimum. The voltage $e_o$ which appears at the detector 16, along with the reference voltage $e_r$ (Equation 20) determines Q.

In order to find $e_r$, the switch 21 is actuated, placing one terminal of the reference capacitor 10 at ground potential. The detector then reads directly the reference voltage $e_r$. By dividing the value of $e_r$ by $e_o$, the value of Q of the specimen capacitor is directly obtained. It will be shown later than Q may be obtained without performing the last-mentioned calculation, using the apparatus of FIG. 1.

Figure 2:
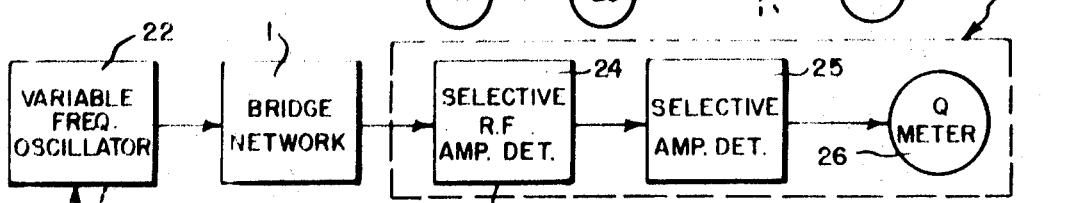
FIG. 2 is a block diagram showing the bridge of FIG. 1 connected in circuit with an A.C. signal source and a detector.

FIG. 2 shows a block diagram of the bridge circuit 1 of FIG. 1, in which the applied bridge voltage is provided through the transformer 13 by a variable frequency oscillator and buffer amplifier 22 combined with modulating oscillator 23 for modulating, or gating, the buffer amplifier on and off. A modulating frequency of 750 cycles per second has been found satisfactory. The detector 16 in this embodiment includes a selective radio frequency amplifier-detector 24 for receiving the high frequency input signal, followed by a second selective amplifier-detector 25 having a pass band about the (750 cycle) modulating frequency. The second amplifier detector 25, which must have a good gain stability, provides at its output the (750 cycle) modulating signal at an amplitude $c_o$. This signal is fed to a Q meter 26, which is a voltmeter. The amplifier-detector 24 may advantageously have a pass band of about 1500 cps. (±750 cycles) and may be ganged to the oscillator 22 so that both are centered at the same frequency. The pass band of the second amplifier-detector 25 may be as narrow as 20 cycles, for good signal-to-noise ratio.

Figure 3:
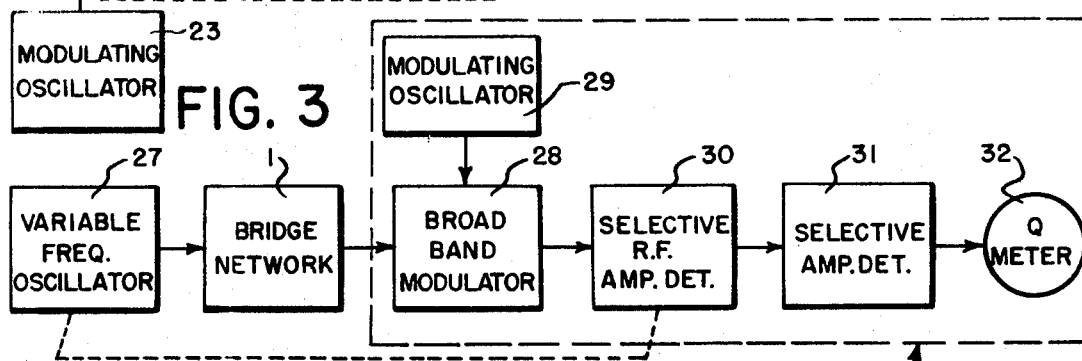
FIG. 3 is an alternate embodiment showing the bridge of FIG. 1 connected with an alternate signal source and a detector.

An alternative apparatus for performing the method of this invention is shown in FIG. 3, in which a variable frequency oscillator 27 is provided for applying a voltage $e_g$ to the bridge circuit through transformer 13. The detector 16 in this embodiment comprises a broad band modulator 28 (ganged to the oscillator 27) modulated by an oscillator 29, preferably set to gate the modulator output at a frequency of 750 cycles per second. The output signal from the broad band modulator 28 is fed through a selective radio frequency amplifier 30 and a second selective amplifier-detector 31 having a pass band centered at the (750 cycle) modulating frequency. The output voltage $e_o$ is applied to a Q meter 32, as described with respect to the previous embodiment. While the apparatus shown in FIG. 2 displays a better signal-to-noise ratio, that shown in FIG. 3 eliminates the possibility present in the circuit of FIG. 2 of error production by modulation side-band products at low measurement frequencies.

By providing means for adjusting the amplifier gain of detector 16, the Q of a specimen capacitor may conveniently be measured without having to calculate a voltage ratio, as described above. First, as described above, the resistance balance is adjusted with the test capacitor 8 connected in the bridge circuit. Then, to measure Q, the specimen capacitor is connected between terminals 18 and 20 and the bridge is adjusted for a null. The reference switch 21 is then actuated and the gain of the detector 16 is adjusted so that the Q meter reads "1," on its calibrated scale (not shown). The reference switch is then de-actuated, whereupon the Q meter directly displays on its calibrated scale the value of Q for the specimen capacitor. To measure Q by this method the scale must be calibrated linearly as 1/Q, but the scale markings should be in terms of Q.

By connecting capacitors of known capacitance value across certain of the external terminals 17 through 20, the measurement range of the apparatus of FIG. 1 can be substantially enlarged. For example, if the capacitances of capacitors 6 and 7 are respectively 250 and 5,000 pf., then connection of a 45,000 pf. capacitor between the Lo and ground terminals 18 and 19 effectively makes $n=200$, so that the circuits of FIGS. 1–3 can directly measure capacitance in the range 200–10,000 pf. Similarly, the measuring range may be lowered by a factor of 10 by connecting a 2250 pf. capacitor between the R and ground terminals 17 and 19, effectively making $n \simeq 2$. The apparatus is then capable of directly measuring capacitors in the range 2–100 pf. It will be apparent that the connection of capacitors of different values to the external terminals 17–20 enables the measurement range of the apparatus to be extended in either direction, as desired.

A further reason for provision of the test capacitor 8 is to permit capacitance measurements below 20 pf., by measuring the capacitance of the test capacitor 8 in parallel with the specimen capacitor and then merely subtracting the value of the test capacitor. Capacitance measurement, particularly of low Q capacitors, is extremely accurate with the present apparatus due to provision of the resistance balance. Ordinarily, the null obtained in measuring capacitance is very broad and indistinct for low Q capacitors. Consequently the value of capacitance, determined at the center of this null is as vague as the center of the null itself. Provision of the resistance balance, which should be adjusted with the test specimen connected to the bridge, leads to a more pronounced and sharper null, enabling a very accurate measurement of capacitance. (It will be apparent that $e_o$ bears no relationship to Q after so adjusting the resistance balance.)

It will be apparent that the apparatus of FIGS. 1–3 can be used for measuring the Q of inductors, reactive solid state circuits, transmission line circuits, filter networks, and so forth. To measure the Q of an inductive reactor, it is connected in parallel with a high-Q capacitor of known value in the bridge circuit; the measured reactance and Q (at null) are then adjusted to eliminate the effect of the known capacitor. The radio frequency resistance of a resistor may be measured in a similar manner. Besides the measurement of Q, the apparatus is capable of simple and highly accurate measurement of capacitance. The apparatus of the invention is capable of measuring capacitance and Q more simply and over a larger range than has heretofore been obtained, with extreme accuracy.

It will be apparent that the invention is not limited to the specific features in the above-described preferred embodiments and that various modifications may be made without departing from its scope as defined in the claims.

I claim:

1. A method of measuring the Q of a reactance having a finite Q, comprising:
    (a) connecting such a reactance as one arm of a bridge circuit, the remaining arms of said bridge circuit containing essentially reactive elements of the same kind as that to be measured, said bridge circuit having an A.C. voltage source connected across one bridge diagonal and a detector connected across the other bridge diagonal, the reactive elements in two of said bridge arms having reactance values in the ratio $1:n$;
    (b) bringing the birdge circuit to a null condition by varying the reactive elements in a third one of said remaining arms so that the voltage across said detector is a minimum; and
    (c) comparing said voltage with a known reference voltage equal to the voltage of said A.C. voltage source multiplied by $$\frac{n}{(1+n)^2}$$

to determine the Q of said reactance.

2. A method as defined in claim 1 including determining said reference voltage by connecting the elements of such bridge circuit such that a voltage equal to said reference voltage appears across said detector in response to the signal provided by said A.C. voltage source, and reading the reference voltage from the detector.

3. A method as defined in claim 1 wherein said reactance and said reactive elements are capacitors.

4. A method as defined in claim 2 wherein said reactance and said reactive elements are capacitors.

5. A method as defined in claim 4 wherein the remaining reactive element is a variable capacitance, high-Q capacitor.

6. A method as defined in claim 5 wherein said A.C. voltage source is connected in parallel with a resistance balance and said bridge circuit includes a high-Q capacitor connectible therein in place of said reactance, said method including connecting said high-Q capacitor in the bridge circuit and adjusting the resistance balance to minimize the detector voltage prior to connecting the reactance as an arm of the bridge circuit and bringing the bridge circuit to a null condition.

7. Apparatus as defined in claim 2 wherein said voltage source is a variable frequency oscillator and said detector includes a broad band modulator, the output of which is connected to a selective amplifier-detector having its output connected to a second amplifier-detector connected to drive said meter, said detector including means for modulating said modulator at a modulation frequency to which said second amplifier-detector is tuned.

8. A method for measuring the Q of a reactance having a finite Q wherein said such reactance is connected as one arm of a bridge circuit, the remaining arms of which contain essentially reactive elements of the same kind as that to be measured, and said bridge circuit having an A.C. voltage source connected across one bridge diagonal and a detector connected across the other bridge diagonal, said method comprising:
  (a) bringing the bridge circuit to a null condition by varying one of the reactive elements in said remaining arms so that the voltage across the detector is a minimum;
  (b) comparing said voltage with a known reference voltage to determine the Q of such reactance.

9. A method as defined in claim 8 wherein said reactance and said reactive elements are capacitors.

10. A method as defined in claim 9 including determining said reference voltage by connecting the elements of such bridge circuit such that a voltage equal to said reference voltage appears across said detector in response to the signal provided by said A.C. voltage source, and reading the reference voltage from the detector.

11. A method as defined in claim 9 wherein the reference voltage is related to the voltage provided by said A.C. voltage source by a transfer function $$\frac{n}{(1+n)^2}$$

where $n$ is the ratio of the capacitances of the reactive elements in the two bridge arms forming one series branch of said bridge circuit.

12. Apparatus for measuring the Q of a specimen reactance, comprising;
  (a) circuit means for forming a bridge circuit in conjunction with such specimen reactance, said circuit means forming three arms of such bridge circuit containing essentially reactive elements of the same kind as that to be measured, the reactances of two of said reactive elements being in the ratio $1:n$ and the third of said arms containing a variable high-Q reactance having an indicator for indicating its reactance value;
  (b) a pair of input terminals and a pair of output terminals in said circuit means for respectively supplying a signal $e_i$ to and obtaining a signal $e_o$ from the bridge circuit; and
  (c) switching means in said circuit means for connecting the output terminals to the input terminals such that the electrical transfer function between them $e_o/e_i$ is equal to $$\frac{n}{(1+n)^2}$$

13. Apparatus as defined in claim 12 wherein said reactance and said reactive elements are capacitors.

14. Apparatus as defined in claim 12 wherein said first and second reactive elements are connected in series across said input terminals, said circuit means including a resistance balance connected across said input terminals for balancing the Q's of the first and second reactive elements.

15. Apparatus as defined in claim 12 including a detector connector across said output terminals for determining the ratio of the voltages as said output terminals before and after actuation of the switching means, whereby the ratio of said output voltages is equal to the Q of the specimen reactance.

16. Apparatus as defined in claim 15 including a voltage source connected to said input terminals, said voltage source including a variable frequency oscillator and means for modulating the variable frequency oscillator at a modulating frequency; said detector including a meter for reading the output terminal voltage, and an amplifier-detector, the output of which is connected to a second amplifier-detector tuned to said modulating frequency and the output of which is connected to said meter.

17. Apparatus as defined in claim 13 wherein the arm of said bridge circuit containing the reactance to be measured includes means for connecting therein a test capacitor having a known capacitance value in place of such reactance, said test capacitor being composed of three parallel plates, serially arranged, the outer ones of said plates being connected in said bridge circuit and one of them being connected to a terminal of the variable, high-Q capacitor, said apparatus including switching means for connecting the middle one of said parallel plates alternatively to (1) that other one of said parallel plates which is connected to a terminal of said variable capacitor or (2) ground.

References Cited
UNITED STATES PATENTS

| | | | |
|---|---|---|---|
| 2,047,782 | 7/1936 | Jensen | 324—57 |
| 2,081,690 | 5/1937 | Unk | 324—57 |
| 2,571,791 | 10/1951 | Tompkins | 324—62 |
| 3,085,194 | 4/1963 | Revesz | 323—75 |

FOREIGN PATENTS

| | | |
|---|---|---|
| 829,622 | 1/1952 | Germany. |

EDWARD E. KUBASIEWICZ, Primary Examiner